United States Patent [19]

Imhof et al.

[11] Patent Number: 5,397,659
[45] Date of Patent: Mar. 14, 1995

[54] ELECTROCHEMICAL STORAGE DEVICE

[75] Inventors: Otwin Imhof, Nürtingen; Holger Kistrup, Esslingen, both of Germany

[73] Assignee: Deutsche Automobilgesellschaft mbH, Braunschweig, Germany

[21] Appl. No.: 159,866

[22] Filed: Dec. 1, 1993

[30] Foreign Application Priority Data

Dec. 1, 1992 [DE] Germany .............. 42 40 339.1

[51] Int. Cl.⁶ ............................................. H01M 2/28
[52] U.S. Cl. ..................................... 429/161; 429/211; 29/623.4
[58] Field of Search ............... 429/161, 211, 245; 29/623.4

[56] References Cited

U.S. PATENT DOCUMENTS

| | | |
|---|---|---|
| 3,369,937 | 2/1968 | Himy ........................... 429/161 |
| 4,215,190 | 7/1980 | Ferrando et al. ............. 429/245 X |
| 4,687,719 | 8/1987 | Von Benda et al. ......... 429/245 X |
| 5,246,797 | 9/1993 | Imhof et al. ................. 429/211 |

FOREIGN PATENT DOCUMENTS 3238485  4/1985  Germany .
3632352 10/1987  Germany .

*Primary Examiner*—Stephen Kalafut
*Attorney, Agent, or Firm*—Evenson, McKeown, Edwards & Lenahan

[57] ABSTRACT

An electrochemical storage device and a process for making the same has electrode plates of differing polarity which are stacked one upon the other. Each one of the electrode plates exhibits a metallized electrode structure and a current tapping vane which is resistant to bending and which is electrically conductively secured to a welding margin of the electrode structure. The same-polarity current tapping vanes of the electrode plates are electrically connected to a connecting strap extending parallel to the electrode plate stack and within the storage device housing. In order that, inter alia, the service life of the electrochemical storage device should be increased, the current tapping vanes disposed at the electrode structures are permanently shaped in accordance with their installation position essentially only outside the welding margin, in such a manner that in the installed condition they are free from mechanical stresses in the region of the welding margin onto the electrode structure.

17 Claims, 4 Drawing Sheets

ELECTROCHEMICAL STORAGE DEVICE

SUMMARY OF THE INVENTION

The present invention relates to an electrochemical storage device having electrode plates of differing polarity which are stacked one upon the other, in which each electrode plate is formed of a metallized electrode structure with a current tapping vane which is resistant to bending and which is secured to a welding-on margin of the electrode structure in an electrically conductive manner and in which the individual same-polarity current tapping vanes of the electrode plates are electrically connected within the storage device housing to a connecting strap extending parallel to the electrode plate stack. The present invention also relates to a process for the manufacture of an electrochemical storage device, in which metallized electrode structures are manufactured and for the formation of electrode plates in each instance individual current tapping vanes are welded onto the welding-on margin of the electrode structures, in which processes the electrode structures are filled with active mass and the prepared electrode plates are stacked one upon another with the intercalation of further plate-shaped components, such as separators, diffusion structures or recombiners etc., to form an electrode plate stack and same-polarity current tapping vanes are electrically conductively connected to a connecting strap, for the manufacture of an electro-chemical storage device.

Within a storage device housing, previously known electrochemical storage devices have electrode plates, as known for example from German Patent Document 3,632,352. These electrode plates formed with an electrode structure of fibrous construction with a current tapping vane welded onto a welding margin of the electrode structure, are stacked on one another to form a stack of electrode plates. In this case, between electrode structures of differing polarity there are disposed separators and, in the case of duplex negative electrode plates, between individual electrode structures of a duplex negative electrode plate there are disposed metallized diffusion structures or recombiners, which exhibit a good electrical contact with the individual electrode structures.

Subsequently, the ends of the current tapping vanes, which are provided with a bore, are sequentially fitted on hexagon-head screws with the intercalation of spacer discs, and are braced against one another by two nuts disposed at the two ends of the bolts. Since the nuts remain within the storage device housing and the electrode structures rest tightly against the storage device housing, the bolt extends, at most, to the height at which it is in alignment with the uppermost or respectively lowermost flat side of the outer electrode plates. Accordingly, before the nuts are tightened, the outer current tapping vanes must first be pressed over the bolts. This operation and the fitting of the spacer discs, which in this case always jump out again, is very time-consuming. When the nuts are tightened, the spacing between the individual ends of the current tapping vanes and thus also between the welding margins of the electrode structures is reduced. Since roughness peaks project in all directions from the metallized fibrous structure and may penetrate into the separator, this spacing reduction involves an intensified dendrite formation and thus an intensified risk of short-circuiting in such regions. Since the thickness of the material of the separators is very small (in general, it amounts to between 0.1 mm and 0.5 mm) even small alterations of the thickness increase of the risk of short-circuiting. In operation this fact makes itself particularly noticeable, since the volume of the electrode structures and of the separators constantly alters in the course of the charging and discharging processes.

German Patent Document 3,238,485 discloses a battery having electrode plates which are formed by electrode structures which are prepared from extended metal and which in each instance two are connected to one another by a solid transverse web along their longitudinal margins. To form anode and cathode, the electrode plates which are U-shaped in cross-section with opposite transverse webs and electrode structures which are parallel and almost congruent are progressively fitted into one another. The transverse web projects at the top beyond the margin of the extended metal, whereby the current tapping vanes are formed by this projecting length. The individual similar-polarity current tapping vanes are electrically conductively connected to a connecting strap, which for its part is connected to a pole of the battery. In the case of electrode plates with electrode structures of fibrous construction, such a design is however not possible, since the electrode plate would then be too unstable.

An object of the invention is to provide an electrochemical storage device and a manufacturing process of the above-described type, but with increased functional reliability and reduced risk of the short-circuiting of electrode plates of differing polarity as a result of dendrite formation, and in which the storage device can be constructed in a simpler manner.

This and other objects are achieved by the present invention which provides an electrochemical storage device comprising electrode plates of differing polarity which are stacked one upon the other, wherein each electrode plate is a metallized electrode structure having a welding margin, and includes a current tapping vane that is resistant to bending and is secured to the welding margin of the electrode structure in an electrically conductive manner. A storage device housing houses the electrode plates in an installed condition. Connecting straps extend parallel to the electrode plates, with individual same-polarity current tapping vanes of the electrode plates being electrically connected within the storage device housing to one of the connecting straps. The current tapping vanes disposed at the electrode structures are permanently shaped in accordance with an installation position essentially only outside the welding margin such that the current tapping vanes are free from mechanical stresses in the region of the welding margin when the current tapping vanes are in an installed condition.

The above stated objects are also achieved by an embodiment of the present invention which provides a process for the manufacture of an electrochemical storage device, comprising the steps of providing metallized electrode structures and initially planar current tapping vanes, forming electrode plates from the electrode structures and the current tapping vanes by welding individual current tapping vanes onto a welding-on margin of the electrode structures, filling the electrode structures with active mass, stacking the electrode plates one upon another, intercalating further plate-shaped components between the electrode plates to form an electrode plate stack, electrically conductively connecting same-polarity current tapping vanes to a connecting strap, and permanently shaping the initially planar current tapping vanes, prior to the stacking of the electrode plates, outside the welding margin occupied in common by the electrode structures and the current tapping vanes in accordance with a subsequent installation position of the current tapping vanes such that the welding margin when the electrode plates are installed is free from mechanical stresses.

The permanent shaping of the current tapping vanes disposed on the electrode structures corresponding to their installation position reduces or prevents the mechanical stresses previously present, in the assembled condition, in the region of the margin for welding onto the electrode structure. As a result of this, in the region of the welding margin the extent of the flexing of the resilient electrode structure is reduced, whereby also a pressing-together of the separators, which promotes the short-circuiting with dendrite formation, is reduced or entirely eliminated. Furthermore, the assembly for the securing of the current tapping vanes to the connecting straps is simplified, since in this case also the outer current tapping vanes can be pressed over the bolts without great application of force. As a result of this, the current tapping vanes which are fitted onto the bolts of the connecting strap and which are disposed at the end side exhibit only a low or even no prestress, for which reason they themselves and also any possibly intercalated spacer discs remain in their installation position and can easily be secured to the connecting strap. Furthermore, it is possible to reduce the required assembly space of the battery since, as a result of the reduction of the risk of short-circuits between the individual electrode structures, the number of electrode plates to be installed, which is required for the securing of a guaranteed capacity of the electrochemical storage device, is smaller. At the same time, the smaller number of electrode plates also reduces the manufacturing costs for an electrochemical storage device of predetermined capacity.

Other objects, advantages and novel features of the present invention will become apparent from the following detailed description of the invention when considered in conjunction with the accompanying drawings.

DETAILED DESCRIPTION OF THE DRAWINGS

Figure 1:
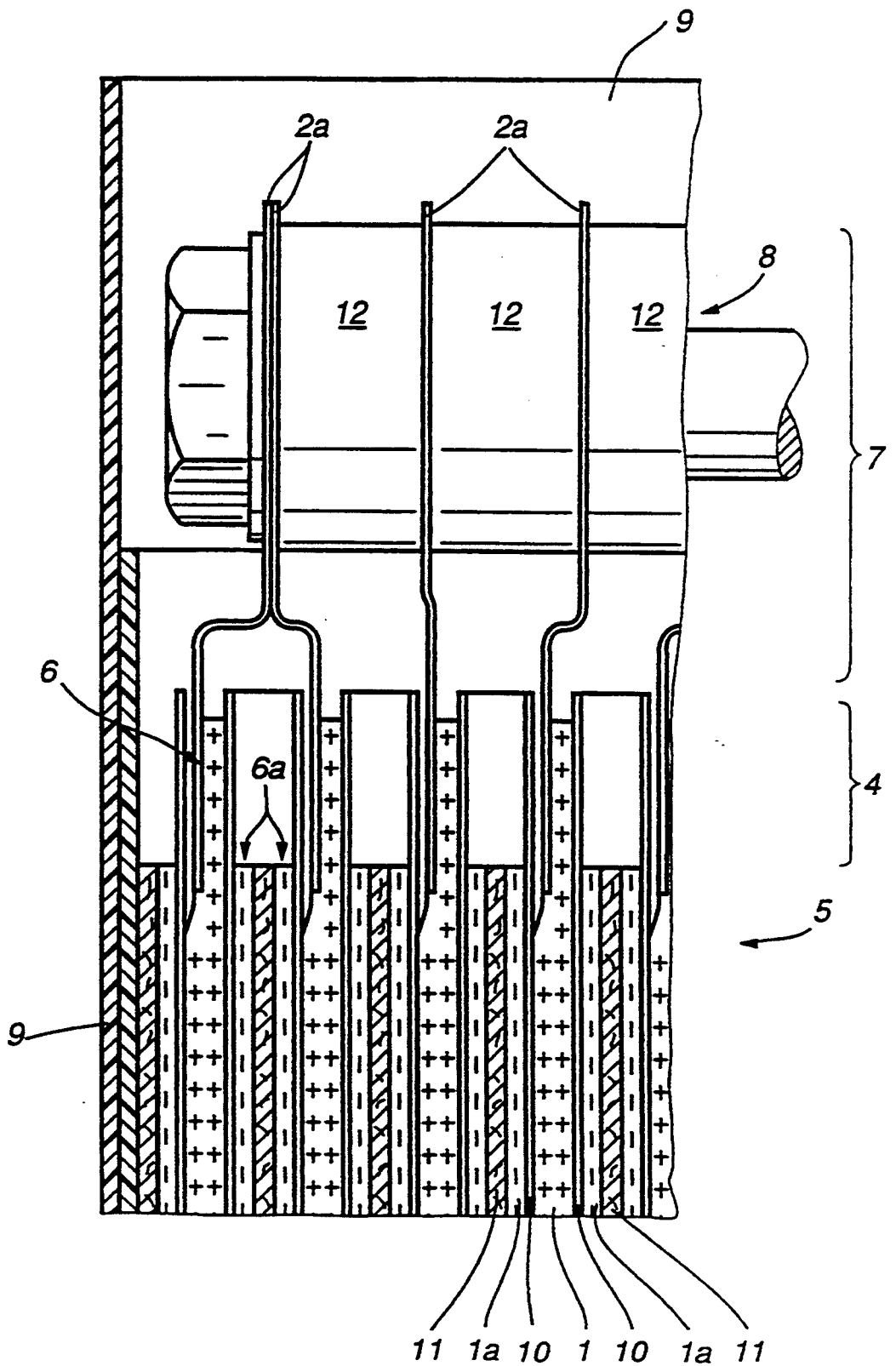
FIG. 1 shows a portion of an electrode plate stack of an electrochemical storage device constructed in accordance with an embodiment of the present invention with an assembled connecting strap for electrode plates of positive polarity which exhibit bent current tapping vanes.

FIG. 1 shows a portion of an electrode plate stack 5 of an electrochemical storage device, which has a plurality of plate-shaped electrode plates 6, 6a of differing polarity which are stacked one upon the other. In this embodiment, two thinner negative electrode plates 6a are associated with each positive electrode plate 6 in each instance. A positive electrode plate 6 forms, together with two negative electrode plates 6a in each instance, an electrochemical voltage element. The electrode plates 6, 6a are in principle formed of a metallized electrode structure 1, 1a when they are of fibrous construction with a current tapping vane 2a, 2b, 2c, 3 (FIGS. 1-3) welded at the margin side onto a welding margin 4 of the electrode structure 1, 1a. Between the positive 1 and the negative electrode structures 1a, there are disposed separators 10, formed, for example, of non-woven material, and between two adjacent negative electrode structures 1a there are disposed recombiners 11.

The current tapping vanes 2a, 2b, 2c, 3 comprise so-called thin current tapping vanes 2a, 2b, 2c, 3, which thus exhibit a low internal resistance and which are resistant to bending. The current tapping vanes 2a, 2b, 2c, 3 associated with each respective electrode structure 1, 1a extend down from the latter and are bent outside the welding margin 4 occupied in common by an electrode structure 1, 1a and a current tapping vane 2a, 2b, 2c, 3, in accordance with its installation position. In the region of the welding margin 4, the current tapping vanes 2a, 2b, 2c, 3 are aligned parallel to the flat side of the electrode structure 1, 1a. Furthermore, in the region of the welding margin 4 each respective current tapping vane 2a, 2b, 2c, 3 is further pressed into the electrode structure 1, 1a. At its free end region 7, the positive current tapping vanes 2a, 2b, 2c, of the positive electrode plates 6 are provided with a recess, through which a bolt belonging to the connecting strap 8 is guided. The positive connecting strap 8 extending parallel to the electrode plate stack 5 is disposed within the storage device housing 9 and is electrically conductively connected with the free end regions 7 of the positive current tapping vanes 2a, 2b, 2c. Between the individual positive current tapping vanes 2a, 2b, 2c, there are inserted spacer discs 12, which guarantee on the one hand a constant spacing of the current tapping vanes 2a from one another and on the other hand a good electrical connection to the connecting straps 8. The positive current tapping vanes 2a, 2b, 2c are permanently shaped prior to assembly outside the welding on margin 4 in accordance with their final position in the electrochemical storage device of the electrode plate stack 5, whereby, together with the security of the positive current tapping vanes 2a, 2b, 2c to the positive connecting strap 8, each respective built-in current tapping vane 2a, 2b, 2c is free from mechanical stresses at the electrode structure 1 in the region of the welding margin 4.

Figure 4:
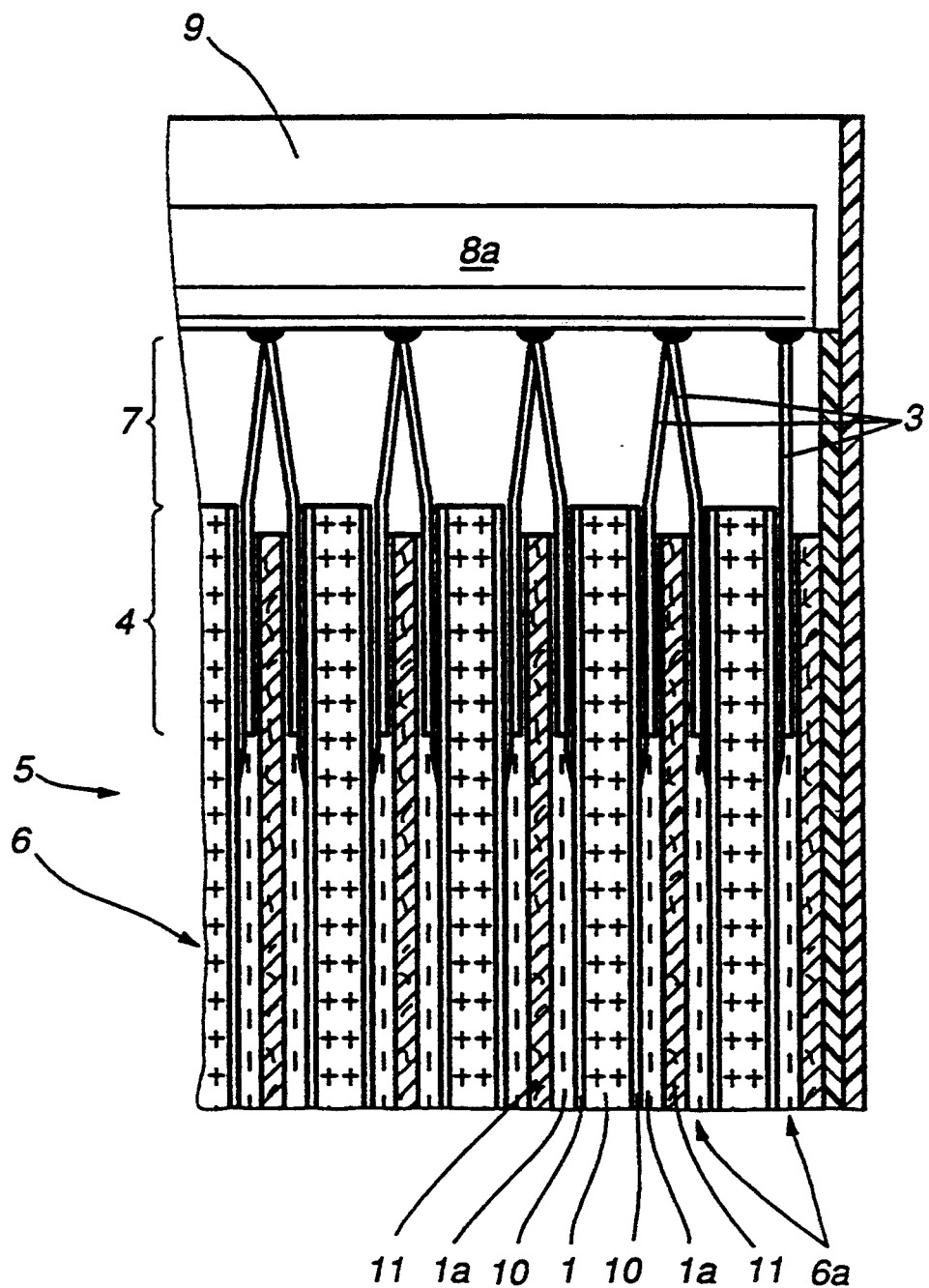
FIG. 4 shows a further portion of an electrode plate stack with a connecting strap mounted on the current tapping vanes of the negative electrode plates.

This manner of fitting of the current tapping vanes 2a, 2b, 2c, 3 however does not only relate to the positive current tapping vanes 2a, 2b, 2c, but also to the negative current tapping vanes 3. In the present case, the negative current tapping vanes 3, are, as shown in FIG. 4, disposed at the thinner negative electrode structures 1a. In this embodiment, the negative current tapping vanes 3 are welded onto those flat sides of the negative electrode structures 1a which are remote from the positive electrode structure 1. For the mechanical and electrically conductive security of these current tapping vanes 3, adjacent negative current tapping vanes 3 of negative electrodes, which are separated by the recombiner, are brought together at their free end and welded in common to the negative connecting strap 8a. This manner of connection provides the advantage that on the one hand only short current tapping vanes 3 are required, which thereby exhibit a lower internal resistance, and that on the other hand an improved electrical contact between the negative electrode structures 1a and the intercalated recombiner 11 is present.

In order to increase the volume-related capacity and to stabilize the storage device against vibrations, the electrode plates of the electrode plate stack 5 are prestressed towards one another in the storage device housing 9. An advantageous method of applying this prestress occurs in that the external dimension of the electrode plate stack 5 fitted into the storage device housing 9 in the relaxed condition is greater, in the direction of stacking, than the clear width of the storage device housing 9.

Figure 2:
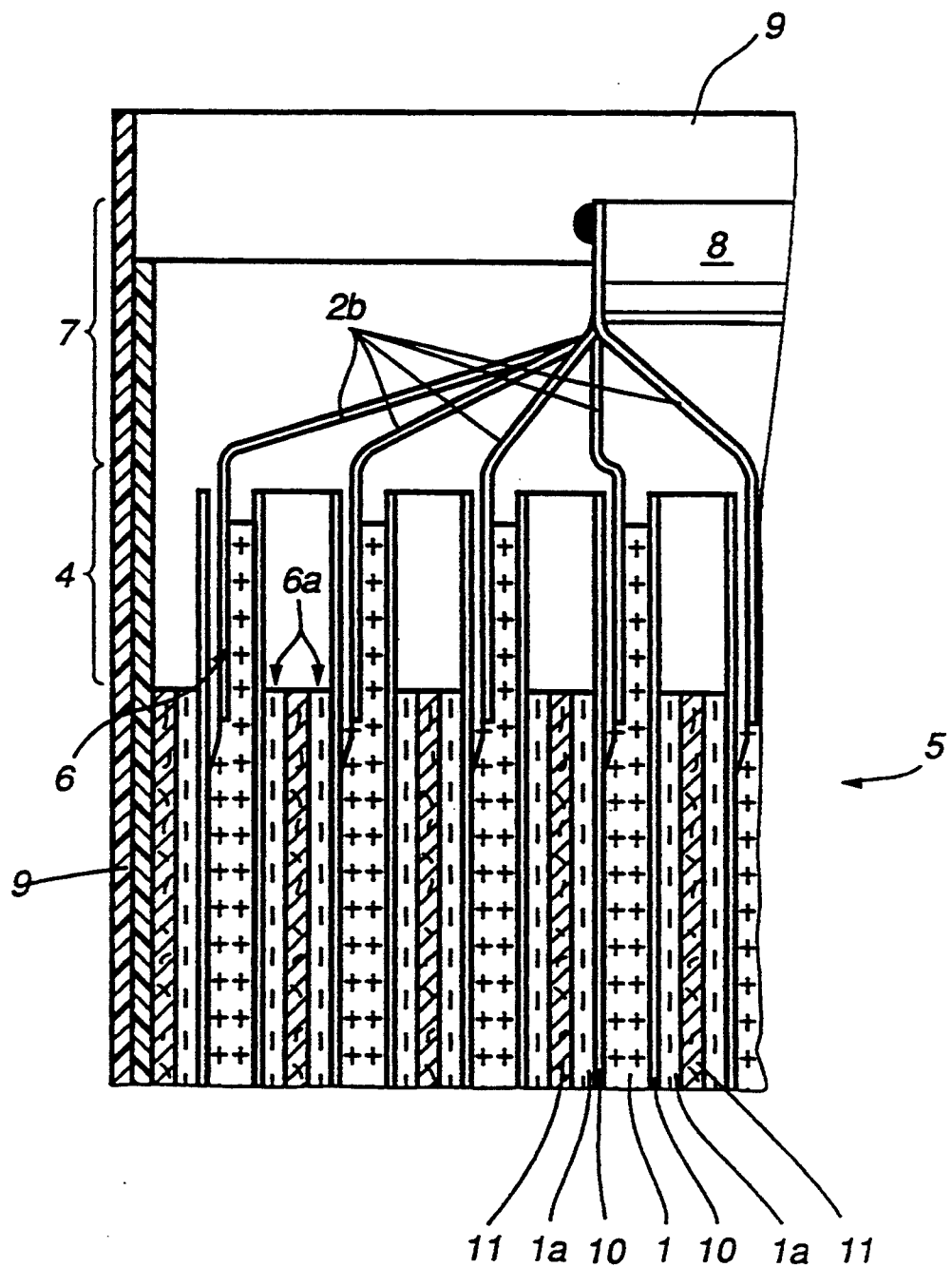
FIG. 2 is a view similar to FIG. 1, of another embodiment that has combined current tapping vanes.

A further exemplary embodiment of the invention is shown in FIG. 2; in this case, this example differs from the preceding one only in that the positive current tapping vanes 2a, 2b, 2c of the positive electrode structures 1 are brought together to a common welding position, at which they are welded onto the positive connecting strap 8. In this embodiment, the length of the connecting straps 8 in the direction of stacking of the electrode plates 6, 6a is selected such that it approximately corresponds to one half the stack height of the electrode plate stack 5. The associated current tapping vanes 2a, 2b, 2c, 3 are then designed to be approximately symmetrical as from both ends of the connecting strap 8, 8a, and thus the number of differently bent current tapping vanes 2a, 2b, 2c, 3 can be reduced.

Figure 3:
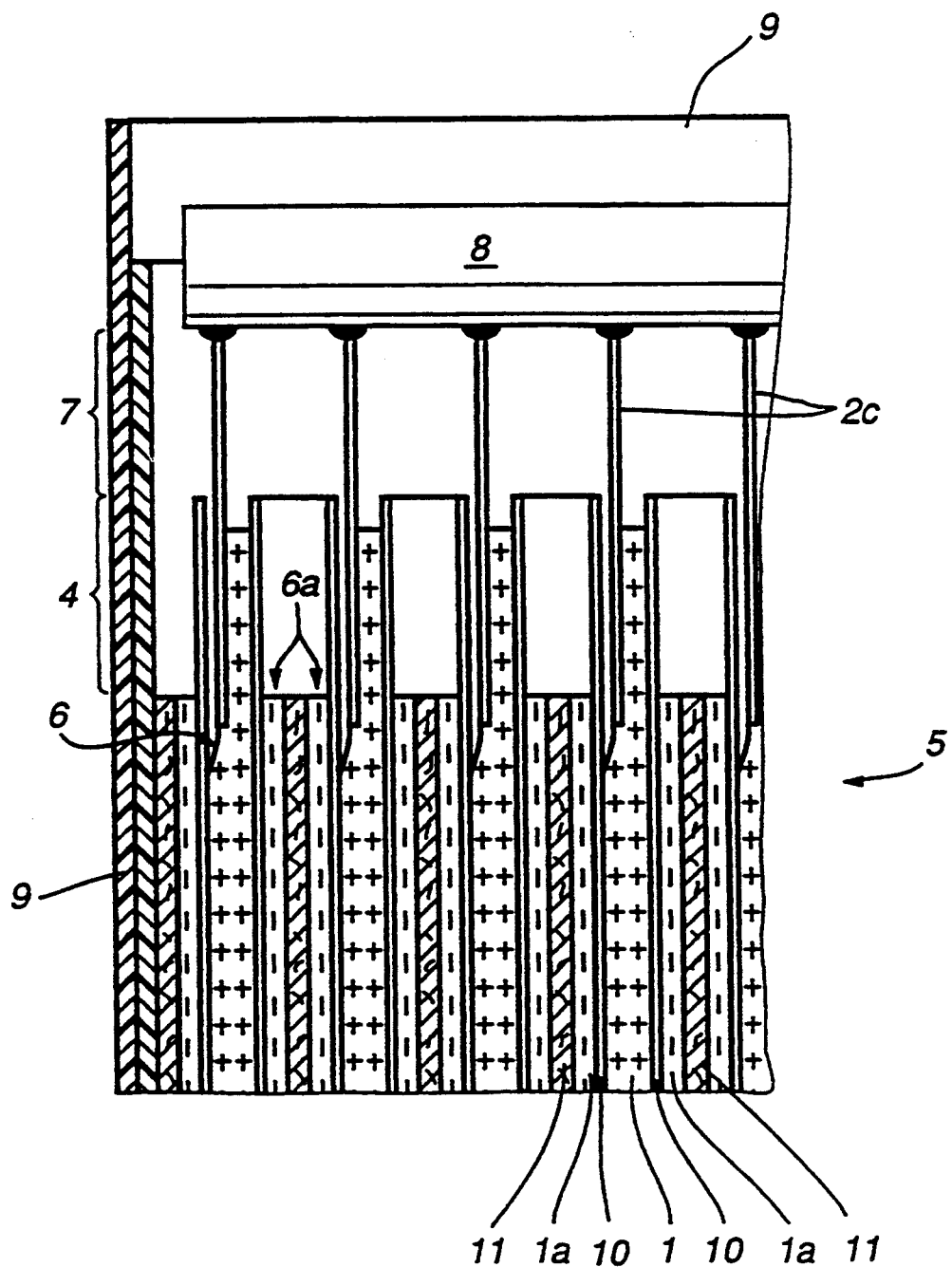
FIG. 3 is a view similar to FIG. 1, of another embodiment that has current tapping vanes guided parallel to the flat sides of the electrode structures.

Another embodiment is shown in FIG. 3. This exemplary embodiment differs from that according to FIG. 1 or respectively FIG. 2 only by the different design of the current tapping vanes 2a, 2b, 2c, 3 and the connecting strap 8, 8a, in which case, for the further reduction of differently bent current tapping vanes 2a, 2b, 2c, 3 the positive current tapping vanes 2a, 2b, 2c, 3 are aligned in a plane extending parallel to the flat sides of the electrode structures 1, 1a and each is individually welded onto the connecting strap 8, which exhibits a length which approximately corresponds to the stacking length of the electrode plate stack 5.

The invention is particularly advantageous when using electrode structures 1, 1a which are prepared from nonwoven material or needle felt webs, in which case the porosity of the unprocessed felt amounts to between 50% and 98%, the weight per unit area of the felt amounts to between 50 g/m$^2$ and 800 g/m$^2$, the synthetic fibers of the felt exhibit a diameter of 0.4 dtex to 7.3 dtex, the synthetic fibers of the felt exhibit a length between 15 mm and 80 mm, the fibers are activated, chemically metallized and galvanically intensified with a metal layer, and the nickel coating of the electrode structure 1, 1a amounts to between 25 mg/cm$^2$ and 300 mg/cm$^2$.

An embodiment for the process of manufacturing the storage device is described below. First, an initially rectangular and planar current tapping vane 2a, 2b, 2c, 3 is connected to the nickel-coated electrode structure 1, 1a in the region of its welding-on margin 4 by a resistance welding process to form an electrode plate 6, 6a and subsequently the electrode structure 1, 1a of the electrode plate 6, 6a is filled with active mass. Prior to assembly to form an electrode plate stack 5, the individual current tapping vanes 2a, 2b, 2c, 3 of the electrode plates 6, 6a filled with active mass are shaped with the aid of a device corresponding to their subsequent installation position in the electrochemical storage device. In this case, for reasons of stability, an angular shaping of the current tapping vanes 2a, 2b, 2c, 3 with small radii is preferred to flexings with large radii. Furthermore, in the case of the bending of the current tapping vanes 2a, 2b, 2c, 3 according to FIG. 1, for each half of the electrode plate stack 5 it is indeed the case that similar, but in no way identical, flexing shapes are required. On account of the thickness of the electrode structures 1, 1a and of the place of connection to the current tapping vane 2a, 2b, 2c, 3 their flexing shape differs slightly. This has the effect that the current tapping vane 2a, 2b, 2c, 3 is bent over onto the upper surface of an electrode structure 1, 1a and also onto the rear surface. Following completion of the shaping of the current tapping vanes 2a, 2b, 2c, 3, there are punched into their free end regions recesses for the bolts of the connecting strap 8, 8a. Between the free end regions 7 of the individual current tapping vanes 2a, 2b, 2c, 3, spacer discs 12 are then disposed, and the connecting strap 8, 8a is pushed through the punched-out recesses and screwed to the current tapping vanes. After all current tapping vanes 2a, 2b, 2c, 3 have been connected to the associated connecting straps 8, 8a, the electrode plate stack 5 is compressed transversely to the flat sides of the electrode plates 6, 6a. The electrode plate stack 5 is lowered in this condition fully into the storage device housing 9, whereby the prestress of the electrode plates 6, 6a of the electrode plate stack 5 is maintained by the storage device housing 9. The above-described process using similar but not identically shaped, current tapping vanes 2a, 2b, 2c, 3 gives a large number of differently shaped current tapping vanes 2a, 2b, 2c, 3 of the electrode plates 6, 6a. This presents a risk of confusion.

This possible risk is reduced by the exemplary embodiment as shown in FIG. 2. In the case of this example, the preparation and assembly take place in this sequence: connection of the plane current tapping vanes 2a, 2b, 2c, 3 by resistance welding to the unfilled electrode structures 6, 6a in which case the lengths of the current tapping vanes 2a, 2b, 2c, 3 are longer than required, and then after the impregnation, flexing of the individual current tapping vanes 2a, 2b, 2c, 3 in accordance with their subsequent installation position. In the assembly of the electrode plate stack 5, by way of example in the case of a 55 Ah battery, which exhibits twenty-two negative electrode plates 6a and eleven positive electrode plates 6, in each instance when half of the current tapping vanes 2a, 2b, 2c, 3 of one polarity are concentrated on each side of the connecting straps 8, 8a; i.e., with respect to the negative current tapping vanes 3, there are on each side eleven current tapping vanes 3 and with respect to the positive current tapping vanes 2a, 2b, 2c there are on one side six and on the other side five current tapping vanes 2a, 2b, 2c. After the concentration, the individual vane bundles are point welded to one another; in this case, the one welding electrode is advantageously laid at the position at which subsequently the connecting strap 8, 8a is disposed. After the welding of the vane bundles, the vane bundles are shortened to the height of the connecting strap 8, 8a, in particular sheared off or punched, and are connected, by fusion welding under argon, to the connecting strap 8, 8a. To protect the separators 10 and the other components of the electrode plate stack 5, these are cooled by a copper rail which is cooled and inserted between the connecting strap 8, 8a and the upper edge of the electrode structures 1, 1a. Subsequently, the welds are further polished for safety reasons. After the welding on of the connecting straps 8, 8a, the electrode plate stack 5 is likewise inserted into the smaller-dimensioned storage device housing 9. The length of the connecting straps 8, 8a corresponds in the illustrated embodiment approximately to one half of the stack height of the electrode plate stack 5, whereby the current tapping vanes 2a, 2b, 2c, 3 of each stack half (only the upper half is shown) can be guided up symmetrically to the respective connecting strap outer surface. Using this procedure, the number of differently shaped current tapping vanes 2a, 2b, 2c, 3 of the electrode plates 6, 6a is indeed reduced, but a danger of confusion is still present.

An embodiment in which this danger of confusion can be excluded is shown in FIG. 3. The current tapping vanes 2a, 2b, 2c, 3 of this embodiment are passed rectilinearly and parallel to the flat side of the electrode structures 1, 1a to the respective connecting straps 8, 8a and are welded to the latter. The other steps for the preparation of the storage device are similar to those of the preceding two exemplary embodiments. An expedient welding of the negative current tapping vanes 3, which in the present case amounts to twice the number of positive current tapping vanes 2a, 2b, 2c, is shown in FIG. 4. The two outer, negative current tapping vanes 3 are, as previously, passed rectilinearly and parallel to the flat side of the electrode structures 1, 1a to the negative connecting strap 8a and are welded to the latter. On the other hand, in the case of all other negative current tapping vanes 3, in each instance the adjacent current tapping vanes 3 of negatives, which are separated by the recombiner, are brought together at their free end regions 7 and are welded in common to one connecting strap 8a.

Although the invention has been described and illustrated in detail, it is to be clearly understood that the same is by way of illustration and example, and is not to be taken by way of limitation. The spirit and scope of the present invention are to be limited only by the terms of the appended claims.

What is claimed is:

1. Electrochemical storage device comprising:
   electrode plates of differing polarity stacked one upon the other to form an electrode plate stack, wherein each electrode plate is a metallized electrode structure having a welding margin, and includes a current tapping vane that is resistant to bending and is electrically conductively connected to the welding margin of the electrode structure;
   a storage device housing that houses the electrodes plates, with individual same-polarity current tapping vanes of the electrode plates electrically connected within the storage device housing to one of the connecting straps,
   wherein the current tapping vanes disposed at the electrode structures are permanently shaped in accordance with an installation position essentially only outside the welding margin such that the current tapping vanes are free from mechanical stresses at the welding margin when the current tapping vanes are in said installation position.

2. Electrochemical storage device according to claim 1, wherein the electrode plate stack has for each positive electrode plate two negative electrode plates, wherein the negative electrode plates have flat sides remote from the positive electrode plates, and the current tapping vanes of negative polarity are disposed on said flat sides of the negative electrode plates.

3. Electrochemical storage device according to claim 2, wherein successive negative electrode plates are separated by a recombiner, and successive negative current tapping vanes of the negative electrode plates are brought together at a free end region and are welded in common to one negative connecting strap.

4. Electrochemical storage device according to claim 1, wherein the electrode plates of the electrode plate stack are prestressed towards one another in the storage device housing transversely to flat sides of the electrode plates.

5. Electrochemical storage device according to claim 4, wherein an external dimension of the electrode plate stack in a relaxed condition, prior to insertion into the storage device housing, together with intercalated further components, is larger, in a direction of stacking of the electrode plate stack, than a clearance width of the storage device housing.

6. Electrochemical storage device according to claim 1, further comprising a separator formed of non-woven material disposed between a positive electrode plate and a negative electrode plate.

7. Electrochemical storage device according to claim 1, wherein the current tapping vanes of one polarity have flat sides that are aligned parallel to flat sides of the electrode structures and are welded on at free ends of the current tapping vanes onto a connecting strap.

8. Electrochemical storage device according to claim 7, wherein the extent of the connecting straps in a direction of stacking of the electrode plates approximately corresponds to one half of the stack height of the electrode plate stack.

9. Electrochemical storage device according to claim 1, wherein the electrode structure is at least one of non-woven material and needle felt webs in which the porosity of the unprocessed felt amounts to between 50% and 98%, in which the weight per unit area of the felt amounts to between 50 g/m$^2$ and 800 g/m$^2$, in which the synthetic fibers of the felt exhibit a diameter of 0.4 dtex to 7.3 dtex, in which the synthetic fibers of the felt exhibit a length between 15 mm and 80 mm, in which the fibers are, chemically metallized and galvanically intensified with a metal layer and in which a nickel coating of the electrode structure amounts to between 25 mg/cm$^2$ and 300 mg/cm$^2$.

10. Process for the manufacture of an electrochemical storage device, comprising:
   providing metallized electrode structures and planar current tapping vanes;
   forming electrode plates from the electrode structures and the current tapping vanes by welding individual current tapping vanes onto a welding margin of the electrode structures;
   filling the electrode structures with active mass;
   stacking the electrode plates one upon another;
   intercalating further plate-shaped components between the electrode plates to form an electrode plate stack;
   connecting same-polarity current tapping vanes to a connecting strap such that the current tapping vanes are electrically conductively connected to the connecting strap, and
   permanently shaping the initially planar current tapping vanes, prior to the stacking of the electrode plates, outside the welding margin occupied in common by the electrode structures and the current tapping vanes in accordance with a subsequent installation position of the current tapping vanes such that the welding margin in an installed condition of the electrode plates is free from mechanical stresses.

11. Process according to claim 10, wherein the step of shaping the current tapping vanes takes place after the welding, the welding being a resistance welding, of the current tapping vane onto the electrode structure, the step of welding including holding the current tapping vane and the electrode structure at least one of in the region of the welding margin and outside the electrode structure.

12. Process according to claim 10, wherein the electrode structures of the electrode plates are first filled and subsequently the current tapping vanes are shaped.

13. Process according to claim 10, wherein after the stacking one upon another of the electrode plates, the free ends of the current tapping vanes are aligned, set against one another and subsequently provided in common with a bored or punched recess that receive the current tapping vanes.

14. Process according to claim 10, wherein after the stacking of the electrode plates, the free ends of the current tapping vanes are aligned, set against one another, electrically conductively connected to one another at the same height by resistance-welding, and subsequently shortened to approximately said height.

15. Process according to claim 14, wherein the connected and shortened ends of the current tapping vanes are laid onto a connecting strap and are welded to the connecting strap.

16. Process according to claim 14, further comprising cooling the electrode plate stack during the welding.

17. Process according to claim 14, further comprising polishing the welds.

* * * * *